Patented June 24, 1930

1,766,060

UNITED STATES PATENT OFFICE

MELVIN DE GROOTE, OF ST. LOUIS, AND LOUIS T. MONSON, OF MAPLEWOOD, MISSOURI, ASSIGNORS TO WM. S. BARNICKEL & COMPANY, OF WEBSTER GROVES, MISSOURI, A CORPORATION OF MISSOURI

PROCESS FOR BREAKING PETROLEUM EMULSIONS

No Drawing.   Application filed January 21, 1929. Serial No. 334,103.

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating petroleum emulsions of the character referred to, into their component parts of oil and water or brine.

Briefly described, our process consists in subjecting a petroleum emulsion of the water-in-oil type to the action of a treating agent or demulsifying agent consisting of a mixture composed of or comprising an organic saponaceous detergent-forming body and a wood sulfite liquor material or substance, thereby causing the emulsion to break down and separate into its component parts of oil and water or brine when the emulsion is permitted to remain in a quiescent state after treatment.

Organic saponaceous detergent-forming bodies of the kind contemplated by our process are materials which combine with soluble alkalies to produce soap or soap-like detergents. Such materials have heretofore been used alone and in admixture with other substances to form treating agents or demulsifying agents suitable for use in the resolution of petroleum emulsions of the water-in-oil type, but so far as we have been able to determine, such organic detergent-forming bodies have never been combined with or used in admixture with wood sulfite liquor materials or substances to produce a demulsifying agent suitable for use in the treatment of petroleum emulsions of the water-in-oil type to break the same.

The organic detergent-forming body or bodies used to form one or more ingredients of the treating agent employed by our process may be in modified or unmodified form, and may be in water-soluble form or oil-soluble form. We prefer to use modified fatty acids in water-soluble form, and particularly modified fatty acids produced by the action of a chemical, such as a sulfonating agent or a halogen, on a fat or fatty acid or fatty material. In the modified detergent-forming body produced by the above reaction there is a simple genetic relationship to the parent material from which it is derived. It may be used as a fatty acid, or as an ester by chemical combination with alcohols, or it may be used as a salt by combination with a suitable base, such as the hydrate of sodium, potassium, calcium, magnesium, or ammonia. One specific example of a modified detergent-forming body that is exceptionally efficient for use in the treatment of emulsions of the kind referred to, is the water-soluble salt produced by the action of ammonia on the detergent-forming body derived from the reaction of sulfuric acid on castor oil. Such modified detergent-forming body is similar to a Turkey-red oil derived from castor oil, and it may be used either in a partially saponified condition, or in a completely saponified condition.

The wood sulfite liquor material or substance that is used to form the other ingredient of the demulsifying agent employed by our process is easy to obtain, and it can be produced or obtained at a relatively low cost. One available source of supply for such substances or materials is the liquor that is obtained as a waste product in the manufacture of paper stock by the sulfite process, which sulfite process, as is well known, consists of cooking wood chips under pressure in a digestor with bisulfite liquor or bisulfite acid, which is obtained by oxidation of sulfur and subsequent reaction with milk of lime, prepared from limestone, preferably a calcium or magnesium limestone. The said cooking operation produces a mixture of wood pulp and wood sulfite liquor, and subsequently, said mixture is subjected to treatment so as to separate and recover the wood pulp from the wood sulfite liquor.

Wood sulfite liquor or liquor extract, suitable for use as one of the ingredients of the treating agent or demulsifying agent employed by our process, can also be produced or obtained as the direct product or principal product of a process consisting of cooking inferior woods not suitable or practicable for use in the manufacture of paper stock, with bisulfite liquor or bisulfite acid, of the kind mentioned, and then recovering the wood sulfite liquor from the unsuitable wood pulp which constitutes the waste product of the process, the cooking operation being carried on under pressure in a digestor or other suitable apparatus.

Concentrated wood sulfite liquor or extract of the kind above referred to is of approximately the following composition:

| | |
|---|---|
| Specific gravity | 30. 2° Baumé |
| Ash | 6. 59% |
| Iron | . 034% |
| Lime (CaO) | 1. 32% |
| Magnesia (MgO) | 1. 54% |
| Solids | 51. 03% |
| Soluble solids | 51. 03% |
| Non-tannin | 28. 80% |
| Tannin | 22. 23% |
| Tannin purity | 43. 54% |

The form, state or condition of the wood sulfite liquor, at the time it is combined with the organic detergent body or bodies to produce the demulsifying agent employed by our process, may be varied to suit existing conditions. It can be used in its natural state, as it comes from the digestor, i. e., in a more or less dilute acid state, but we prefer to neutralize it prior to admixture with the organic detergent body, so that the oil recovered by our process will not have a destructive corroding action on the pipe lines, tank cars or storage tanks in which said oil is confined. One simple and efficient procedure that may be used to neutralize the wood sulfite liquor consists in treating the same with caustic soda, caustic potash, ammonium hydroxide, magnesium oxide, calcium oxide, or other suitable hydrates or carbonates. In order to reduce the expense of transporting the demulsifying agent to the place where it is to be used to treat a petroleum emulsion, the wood sulfite liquor may, if desired, be concentrated so as to increase the specific gravity of same to approximately 30 to 32° Baumé.

The modified detergent-forming body and the wood sulfite liquor or extract used to produce our treating agent or demulsifying agent can be combined in any suitable proportion and by any preferred procedure, and can be used in the alkaline, neutral or acid state. For example, five parts of calcium oleate can be dissolved in fifty parts of a castor oil modified detergent-forming body, and fifty parts of wood sulfite extract can then be emulsified in said solution. We prefer, however, to form the treating agent or demulsifying agent from a mixture consisting of approximately 80 to 90% of the ammonium soap of modified castor oil, as above described, and 10 to 20% of wood sulfite liquor extract of the kind referred to. A mixture of the kind above described is readily water-soluble in the manner of many well-known colloidal solutions, such as ordinary soap, and when mixed with or applied to a petroleum emulsion of the water-in-oil type, produces results, which, in many cases, cannot be duplicated by treating the emulsion with a demulsifying agent composed solely of fatty material or composed solely of wood sulfite liquor.

In practicing our process a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing said agent into the well in which the emulsion is produced; introducing said agent into a conduit through which the emulsion is flowing; introducing said agent into a tank in which the emulsion is stored; or introducing said agent into a container that holds a sludge obtained from the bottom of the oil storage tank. In some instances it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground.

After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constitutents of the oil from volatilizing. If desired, the treated emulsion may be acted upon by one or the other of various kinds of apparatus now used in the operation of breaking petroleum emulsions, such as homogenizers, hay tanks, gun-barrels, filters, centrifuges or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 5,000 parts of emulsion will usually be found to produce commercially satisfactory results.

Having thus described our invention, what we claim and desire to secure by Letters Patent of the United States is:

1. A process for breaking a petroleum emulsion of the water-in-oil type, which consists in subjecting the emulsion to the action of a demulsifying agent comprising wood sulfite liquor material and an organic saponaceous detergent-forming body.

2. A process for breaking a petroleum emulsion of the water-in-oil type, which consists in subjecting the emulsion to the action of a water-soluble demulsifying agent comprising a wood sulfite liquor substance and an organic saponaceous detergent-forming body.

3. A process for breaking a petroleum emulsion of the water-in-oil type, which consists in subjecting the emulsion to the action of a demulsifying agent comprising a modified saponaceous detergent-forming body and wood sulfite liquor material.

4. A process for breaking a petroleum emulsion of the water-in-oil type, which consists in subjecting the emulsion to the action of a water-soluble demulsifying agent comprising a modified saponaceous detergent-forming body and a wood sulfite liquor substance.

5. A process for breaking a petroleum emulsion of the water-in-oil type, which consists in subjecting the emulsion to the action of a demulsifying agent comprising a modified fatty acid body and a wood sulfite liquor substance.

6. A process for breaking a petroleum emulsion of the water-in-oil type, which consists in subjecting the emulsion to the action of a water-soluble demulsifying agent formed from a modified fatty acid body and wood sulfite liquor material.

7. A process for breaking a petroleum emulsion of the water-in-oil type, which consists in subjecting the emulsion to the action of a demulsifying agent composed of a modified castor oil body and a wood sulfite liquor substance.

8. A process for breaking a petroleum emulsion of the water-in-oil type, which consists in subjecting the emulsion to the action of a water-soluble demulsifying agent comprising wood sulfite liquor material and a modified castor oil body.

9. A process for breaking a petroleum emulsion of the water-in-oil type, which consists in subjecting the emulsion to the action of a demulsifying agent comprising aproximately 85% modified castor oil body and 15% wood sulfite liquor material.

10. A process for breaking a petroleum emulsion of the water-in-oil type, which consists in subjecting the emulsion to the action of a water-soluble demulsifying agent comprising 85% modified castor oil body and 15% wood sulfite liquor material.

MELVIN DE GROOTE.
LOUIS T. MONSON.